Oct. 17, 1961 R. P. B. YANDELL 3,004,706

COMPUTING MACHINES

Filed Sept. 24, 1956 6 Sheets-Sheet 1

Inventor
RONALD P. B. YANDELL
By [signature]
Attorney

Oct. 17, 1961 R. P. B. YANDELL 3,004,706

COMPUTING MACHINES

Filed Sept. 24, 1956 6 Sheets-Sheet 2

Inventor
RONALD P. B. YANDELL
By

Inventor
RONALD P.B. YANDELL
By
Attorney

Inventor
RONALD P. B. YANDELL
By
[signature]
Attorney

Oct. 17, 1961 R. P. B. YANDELL 3,004,706

COMPUTING MACHINES

Filed Sept. 24, 1956 6 Sheets-Sheet 5

Inventor
RONALD P. B. YANDELL
By [signature]

Oct. 17, 1961 R. P. B. YANDELL 3,004,706

COMPUTING MACHINES

Filed Sept. 24, 1956 6 Sheets-Sheet 6

Inventor
RONALD P. B. YANDELL
By

United States Patent Office
3,004,706
Patented Oct. 17, 1961

3,004,706

COMPUTING MACHINES

Ronald Percy Bawden Yandell, Streatham, London, England, assignor, by mesne assignments, to International Computers and Tabulators Limited, London, England, a British company Filed Sept. 24, 1956, Ser. No. 611,667
Claims priority, application Great Britain Oct. 25, 1955
7 Claims. (Cl. 235—170)

This invention relates to computing machines and in particular to electrically operated adding apparatus for use therein.

As is well understood, the binary system of calculating affords certain advantages but involves the use of a considerable amount of coding circuitry to obtain the information in binary form and further circuitry to convert the binary answer to the requisite decimal or Sterling form.

It is a main object of the present invention to provide a relatively simple apparatus whereby decimal or Sterling amounts to be added can be transmitted to a coded binary adder for addition thereby and the answer obtained according to the scale of notation of the input digits to the adder.

According to the present invention there is provided electrical computing apparatus comprising a coded binary parallel adder, means to read two parallel binary coded digits simultaneously from store and to transmit them to said adder, a correction coding circuit including correction coding gates to which parallel binary outputs from the adder representative of the binary sum of the binary coded digits are applied, and notation control means operable under control of a scale of notation determining indication read from store and representative of the scale of notation of the binary coded digits to apply a radix determining pulse to said gates thereby to condition said gates so that on application thereto of parallel binary outputs from the adder said gates produce parallel outputs representative of a binary coded digit having the same radix as that of the digits read from the store and as necessary a carry for entry into the adder.

Figure 1:
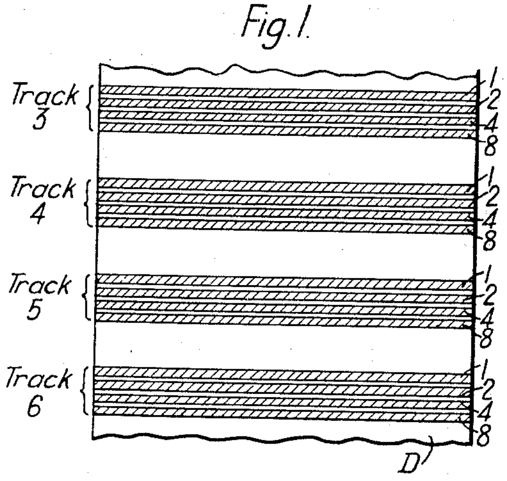
Figure 2:
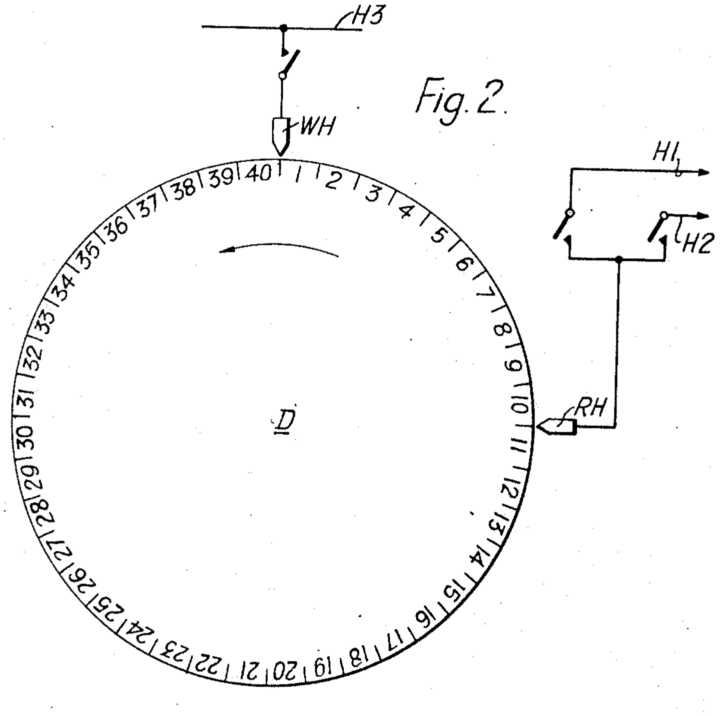
Figure 4:
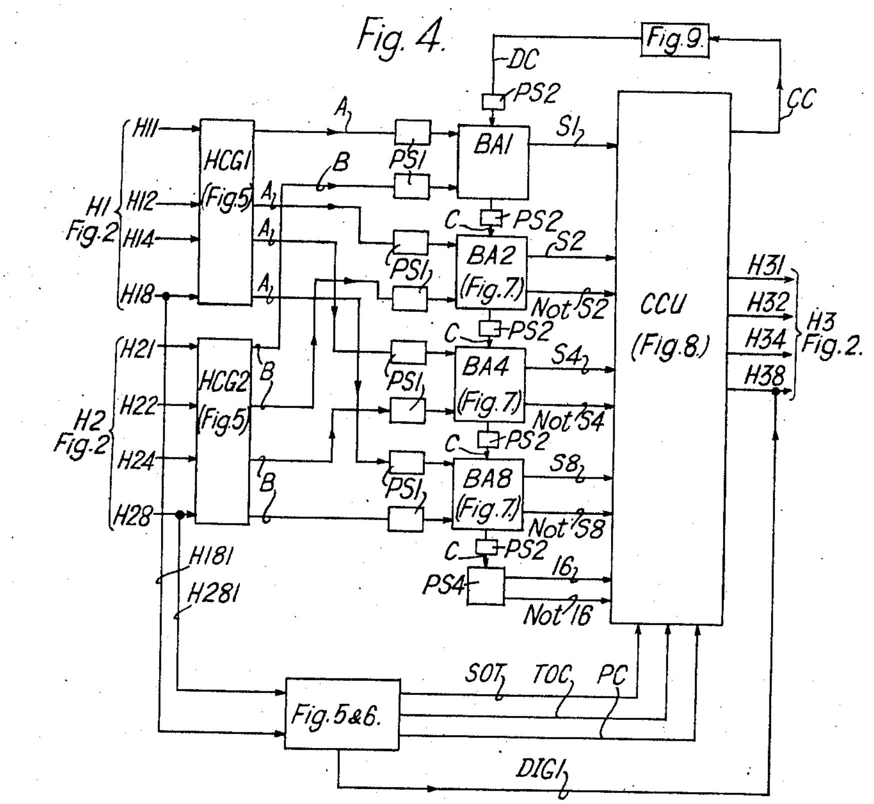
Figure 3:
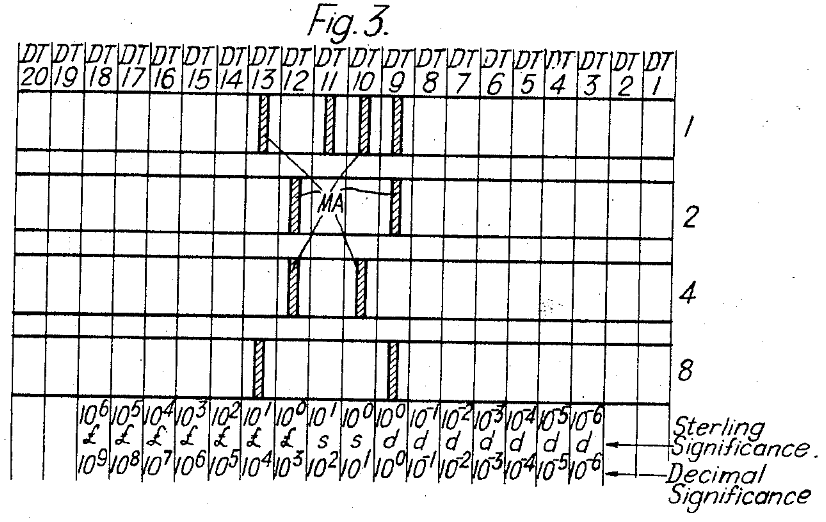
Figure 5:
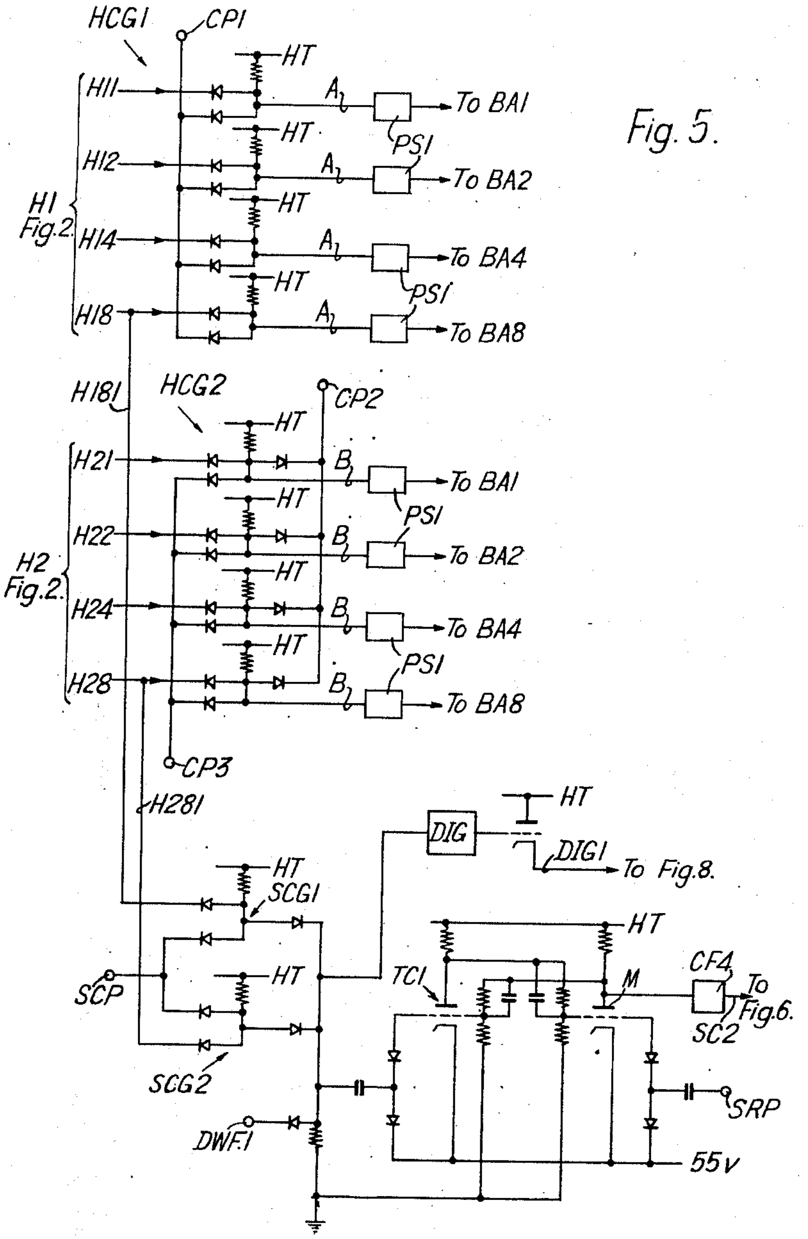
Figure 6:
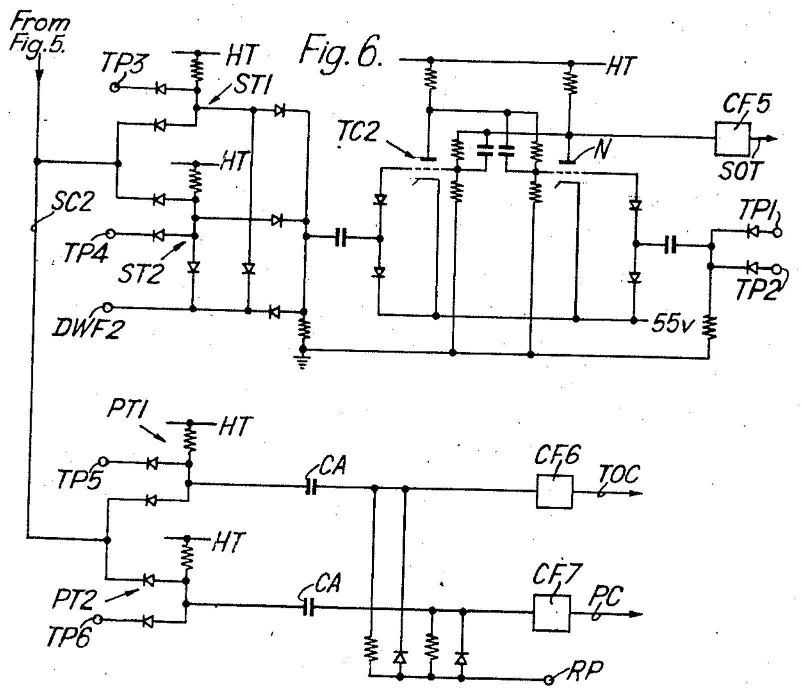
Figure 7:
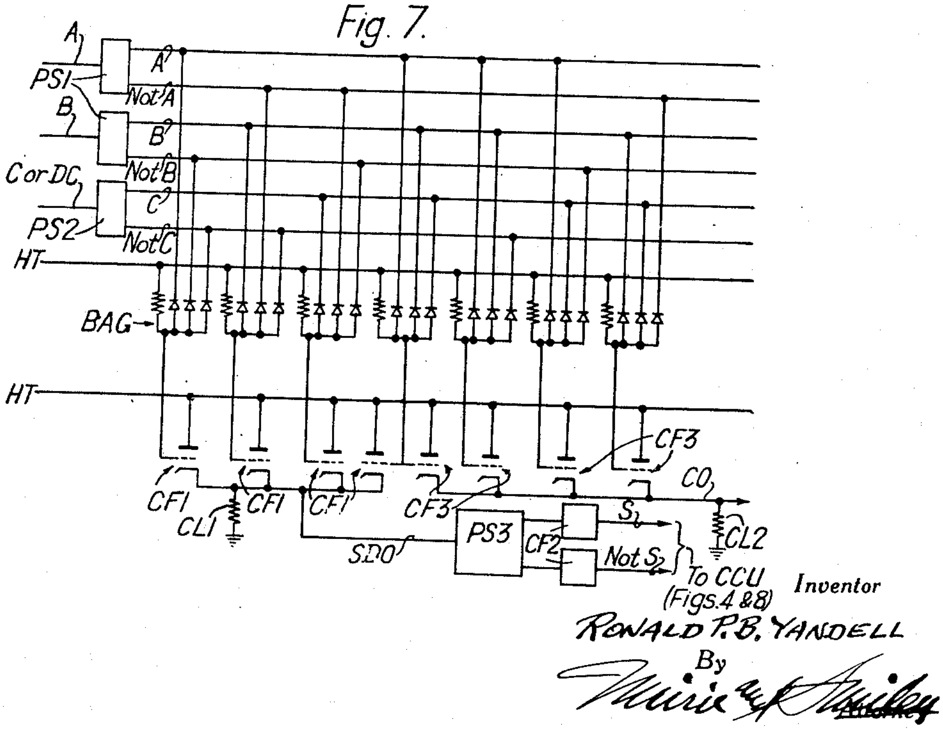
Figure 8:
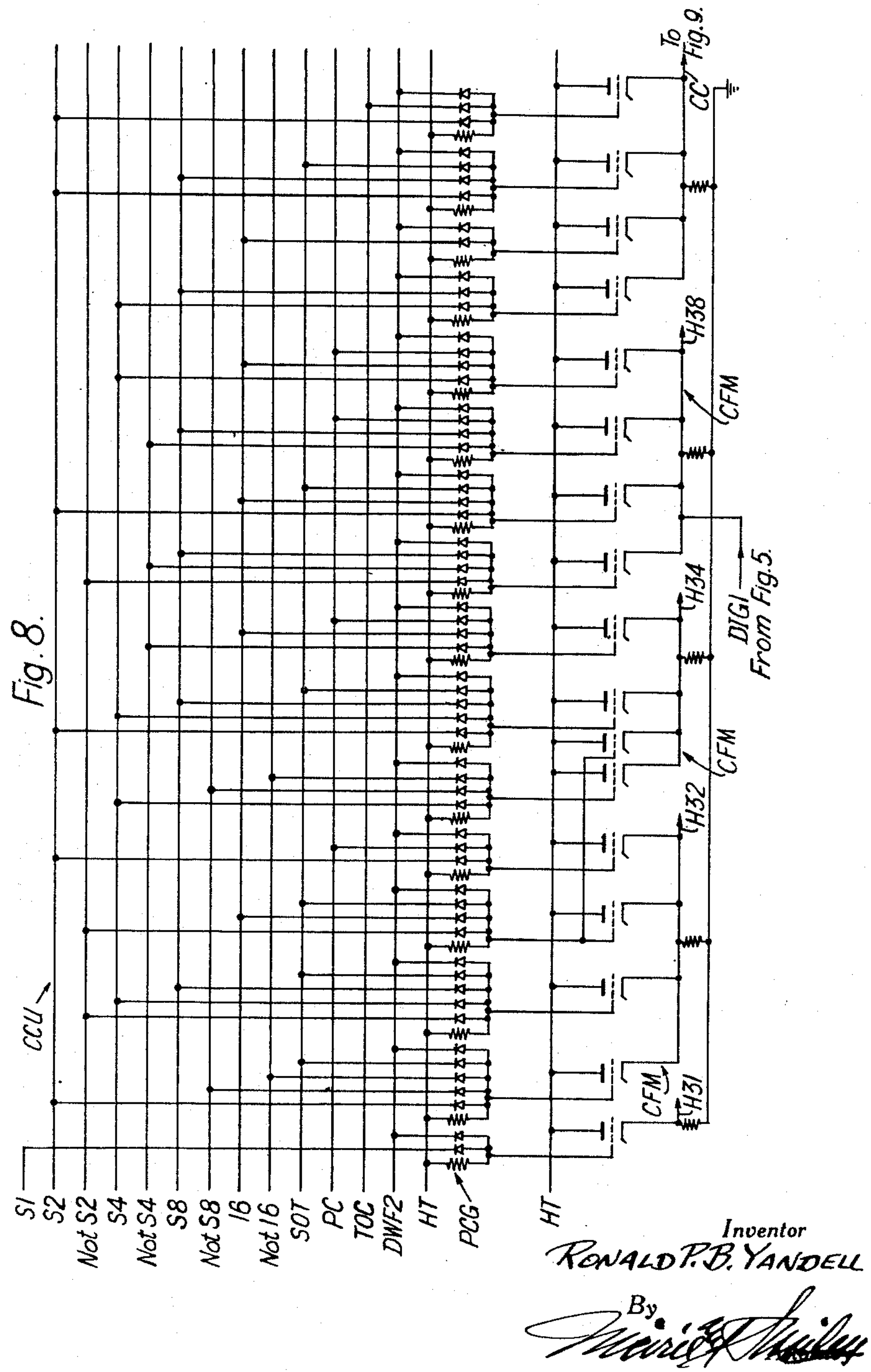
Figure 9:
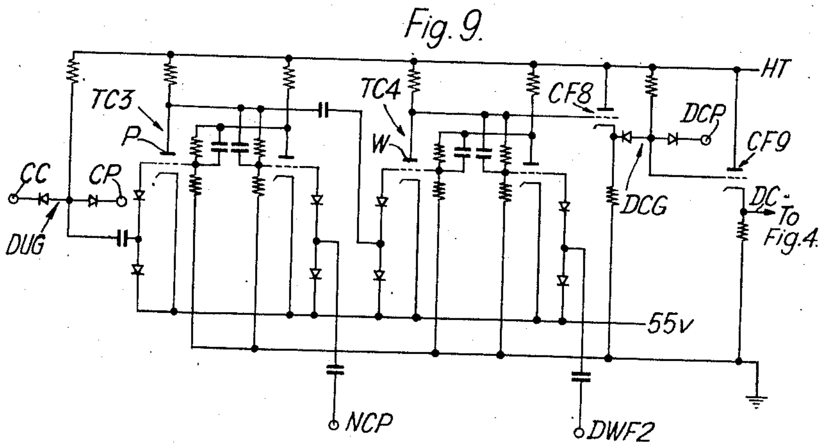
Figure 10:
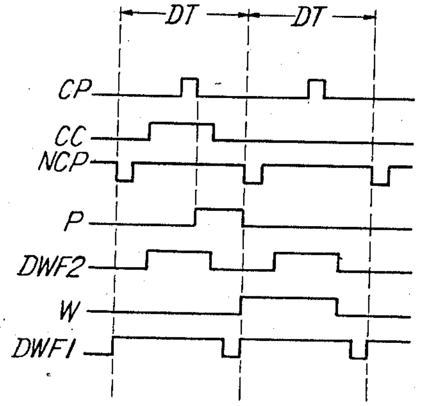

In order that the invention may be more clearly understood, one embodiment thereof will now be described, by way of example, with reference to the accompanying drawings, in which:

FIGURE 1 is an elevation of a portion of a magnetic data-storage drum,

FIGURE 2 illustrates the arrangement of data-receiving sections for a track extending round the drum at right-angles to the axis of rotation thereof, FIGURE 3 illustrates the manner of recording data on a data-receiving section of the drum, FIGURE 4 is a block diagram of computing apparatus according to the invention, FIGURE 5 is a circuit diagram of digit input gates and a Sterling control circuit forming a part of a notation control unit, FIGURE 6 is a diagram of a scale-of-ten control circuit and of a pence and tens-of-shillings control circuits also forming part of the notation control unit, FIGURE 7 is a diagram of a binary adder, being one of four such adders employed as a unit for effecting addition of digits from the input gates of FIGURE 5, FIGURE 8 illustrates a correction coding circuit by which binary digits from the adding unit are coded according to the scale-of-notation of the digits passed by the input gates to the adding unit, FIGURE 9 is a carry delay circuit by which a carry pulse emanating from the correction coding circuit is delayed before being entered into the adding unit, and FIGURE 10 is a waveform diagram illustrating the mode of operation of the carry delay circuit.

In the following description there is, for convenience, described the application of the invention to a computing machine in which numbers to be added are stored, in known manner, on a drum D, FIGURES 1 and 2 having a magnetisable peripheral surface and arranged for continuous rotation about its longitudinal axis. It is to be understood, however, that other forms of number storage may, if desired, be employed.

Referring to FIGURES 1 to 3, the drum storage will be breifly described in-so-far as knowledge of the mode of operation thereof is necessary to the understanding of the present invention.

Numbers to be added, and the terms "added" and "adder" when used herein are deemed to include the operation of subtraction by the addition of complements, are stored on predetermined areas of the drum D extending circumferentially round the drum at right-angles to the axis of rotation thereof and being spaced apart axially on the drum. FIGURE 1 illustrates four such areas or tracks each of which consists of four bands to which, as indicated in FIGURES 1 and 3, there is allocated respectively the significance 1, 2, 4, 8 to permit the recording of digits on the track according to the 1, 2, 4, 8 code.

Each track, as indicated in FIGURES 1 and 2, is to suit the electronic timing, assumed to be divided into forty track locations which, as indicated in FIGURE 2, pass continuously in succession under data-recounting means shown as write heads WH and read heads RH, one for each band of a track. Each track location is, as illustrated in FIGURE 3 assumed to be sub-divided into twenty sub-locations each of which passes beneath write heads and read heads for a period of time during which digit times pulses DT1 to DT20, as appropriate, permit figures coded according to the 1, 2, 4, 8 code to be written on or read from a track location. The track location illustrated in FIGURE 3 is assumed to have the amount £96. 15. 11*d*. recorded thereon by magnetised areas MA, and the order of the sublocations is such that an amount is recorded only in the sub-locations DT3 to DT18, the sub-locations DT1, DT2, DT19 and DT20 having other purposes of which DT2 is a reading time during which there can be read a notation determining indication indicative of the kind of number recorded in sub-locations DT3 to DT18. Thus, if as in FIGURE 3, the number or amount is positive Sterling no recording is made in DT2 but if the amount is negative Sterling a notation determining indication is recorded in the "1" band in sub-location DT2. Should the number be positive decimal a notation determining indication is made in sub-location DT2 in the "8" band, and if the number is negative decimal a notation determining indication is made in sub-location DT2 in each of the "1" and "8"

bands. A recording in the "1" band of DT2 is used to control a digit complementer, forming no part of the present invention and not shown or described herein, whereby there is passed to the adder the complements of the digits read from sub-locations DT3 to DT18 following the reading of a recording in the "1" band of DT2. If, however, the number recorded in the track location is already in the complemental form thereof this is indicated by a recording in the sub-location DT19 as described below.

As can be seen from FIGURE 2 numbers to be added are read from the drum and are transmitted as pulses along highways H1 and H2, as appropriate, each highway consisting of four binary coded lines, one for each track band, shown in FIGURES 4 and 5 as H11, H12, H14, H18 and H21, H22, H24, H28. An answer to be recorded on the drum is transmitted to the write heads along a highway H3, FIGURE 2, which consists of four binary coded lines H31, H32, H34, H38, FIGURES 4 and 8. The arrangement is such that the digits of an amount are read serially from storage, commencing with digit of lowest denominational order, are passed to a coded binary adder comprising binary adders BA1, BA2, BA4, BA8, FIGURE 4, and the answer is recorded on the drum in the same digital order. When two numbers are to be added the digits of like denominational order are read concurrently from store.

The sub-location DT19 is used to indicate either the sign of a number recorded in the track location or that the number recorded is in error due to it exceeding the storage capacity. Thus, if the number is positive there will be no indication in sub-location DT19. If, however, the number recorded is negative it will, as stated above, be in its complementary form and a sign digit "9" will be recorded in sub-location DT19 in bands "1" and "8" thereof. Should there be recorded in sub-location DT19 either "1" or "8" alone this will indicate that the number recorded in the track location is, due to overcapacity, incorrect. Examples of these conditions are as follows:

EXAMPLE 1

Positive result: 5432100000−1234000000=4198100000

| DT 19 | DT 18 | DT 17 | DT 16 | DT 15 | DT 14 | DT 13 | DT 12 | DT 11 | DT 10 | DT 9 |
|---|---|---|---|---|---|---|---|---|---|---|
| 0 | 5 | 4 | 3 | 2 | 1 | 0 | 0 | 0 | 0 | 0 |
| 9 | 8 | 7 | 6 | 6 | 0 | 0 | 0 | 0 | 0 | 0 |
| Carry lost | | | | | | | | | | |
| 0 | 4 | 1 | 9 | 8 | 1 | 0 | 0 | 0 | 0 | 0 |

EXAMPLE 2

Negative result: 1234000000−5432100000=4198100000

| DT 19 | DT 18 | DT 17 | DT 16 | DT 15 | DT 14 | DT 13 | DT 12 | DT 11 | DT 10 | DT 9 |
|---|---|---|---|---|---|---|---|---|---|---|
| 0 | 1 | 2 | 3 | 4 | 0 | 0 | 0 | 0 | 0 | 0 |
| 9 | 4 | 5 | 6 | 7 | 9 | 0 | 0 | 0 | 0 | 0 |
| 9 | 5 | 8 | 0 | 1 | 9 | 0 | 0 | 0 | 0 | 0 |

EXAMPLE 3

Positive overcapacity: 5432100000+6543200000=11975300000

| DT 19 | DT 18 | DT 17 | DT 16 | DT 15 | DT 14 | DT 13 | DT 12 | DT 11 | DT 10 | DT 9 |
|---|---|---|---|---|---|---|---|---|---|---|
| 0 | 5 | 4 | 3 | 2 | 1 | 0 | 0 | 0 | 0 | 0 |
| 0 | 6 | 5 | 4 | 3 | 2 | 0 | 0 | 0 | 0 | 0 |
| 1 | 1 | 9 | 7 | 5 | 3 | 0 | 0 | 0 | 0 | 0 |

EXAMPLE 4

Negative overcapacity: 5432100000−6543200000=11975300000

| DT 19 | DT 18 | DT 17 | DT 16 | DT 15 | DT 14 | DT 13 | DT 12 | DT 11 | DT 10 | DT 9 |
|---|---|---|---|---|---|---|---|---|---|---|
| 9 | 4 | 5 | 6 | 7 | 9 | 0 | 0 | 0 | 0 | 0 |
| 9 | 3 | 4 | 5 | 6 | 8 | 0 | 0 | 0 | 0 | 0 |
| Carry lost | | | | | | | | | | |
| 8 | 8 | 0 | 2 | 4 | 7 | 0 | 0 | 0 | 0 | 0 |

Referring now to FIGURES 4 to 10, the numbers to be added pass along the highways H1 and H2, lines H11, H12, H14, H18, H21, H22, H24, H28, FIGURES 4 and 5, to digit input control gates HCG1 and HCG2 which permit the passage of pulses only during digit times DT3 to DT19 and are arranged to stop the passage of a decimal notation indicating pulse, if present, during digit time DT2. To this end gates HCG1 have a pulse CP1, FIGURE 5, applied thereto during digit time DT3 to DT19 so that they can only pass pulses during these digit times. The gates HCG2 are maintained closed except during digit times DT3 to DT19 by a pulse applied at CP2 which is down in potential during digit times DT1, DT2 and DT20. When addition is being effected a pulse is applied at CP3 but the function of this pulse is not concerned with the functioning of the apparatus according to the present invention. Thus if during digit times DT3 to DT19 pulses are passed to gates HCG1 and HCG2 along lines H11, H12, H14, H18, H21, H22, H24 or H28 they will pass through gates HCG1 and HCG2 as binary pulses A and B respectively and pass through pulse shapers PS1 to the adder.

Any suitable form of coded binary adder unit may be used but as herein described it is assumed that the unit is of the kind from which can be obtained what are known as "netted" outputs from the addition of binary inputs A, B, C where C is a binary carry input. A number of such suitable forms of adder unit are known and it is to be understood that that described below with reference to FIGURES 4 and 7 is mentioned only by way of example and to facilitate the understanding of the present invention.

As illustrated in FIGURE 4, the adder unit consists of four binary adders BA1, BA2, BA4, BA8 each of which, as shown in FIGURE 7, will receive binary inputs A and B and a binary carry input DC, FIGURE 9, if the adder is BA1, which may have been created during the next preceding digit time, or C which may have been produced by an adder BA1, BA2 or BA4. As shown in FIGURE 4, the adder BA1 is arranged to add binary digits appearing on lines H11, H21 and a carry DC from the next preceding digit time. The added BA2 adds the binary digit from lines H12, H22 and a carry C from BA1 while the adders BA4 and BA8 respectively add the binary digits from lines H14, H24, and carry C from BA2, and from lines H18, H28 and carry C from BA4. The outputs from the binary adder unit representing the sum digit coded 1, 2, 4, 8, 16 of which the 16 output is the carry from BA8, are taken to a correction coding unit CCU, FIGURES 4 and 8, which gives a carry output to BA1 together with a sum digit coded 1, 2, 4 and 8 according to the scale of notation of the digits added from highways H1 and H2. The carry from the correction coding unit CCU is, as described belonw, delayed by one digit time before being added into BA1 with the digit of next higher denominational order.

From the foregoing it will be understood that the three inputs to the adder unit consist for BA1 of A, B and DC, and for BA2, BA4 and BA8 of A, B and C, each of which inputs may be "1" or "0" and the outputs from the adders, with or without a carry C, are respectively S1; S2, not S2; S4, not S4; and S8, not S8; FIGURES 4 and 8, the letter S being common to the outputs and being representative of the sum of A, B, C, or combinations thereof. It will also be understood that in each digit time the adder unit adds together two four-digit binary numbers together with any carry from the next preceding digit time and that the sum from the adder unit is represented by a five-digit binary number of which the fifth digit is a carry. It is also to be understood that although there is described herein the use of digits coded according to the 1, 2, 4, 8 code any other suitable code may be used, for example the 1, 2, 4, 5 code, provided that it will accommodate all digits according to the scale of notation being employed, in the present instance both decimal and Sterling digits. Examples of the mode of operation are as follows:

EXAMPLE 5

£5+£7=£12; addition effected in DT12, Sterling

| 16 | BA8 | BA4 | BA2 | BA1 |
|---|---|---|---|---|
| 0<br>0 | 0<br>0 | 1<br>1 | 0<br>1 | 1<br>1 |
| 0 | 1 | 1 | 0 | 0 |

EXAMPLE 6

10d.+9d.=19d.; addition effected in DT9, Sterling

| 16 | BA8 | BA4 | BA2 | BA1 |
|---|---|---|---|---|
| 0<br>0 | 1<br>1 | 0<br>0 | 1<br>0 | 0<br>1 |
| 1 | 0 | 0 | 1 | 1 |

EXAMPLE 7

4+3=7; addition effected in any of DT3 to DT18, decimal

| 16 | BA8 | BA4 | BA2 | BA1 |
|---|---|---|---|---|
| 0<br>0 | 0<br>0 | 1<br>0 | 0<br>1 | 0<br>1 |
| 0 | 0 | 1 | 1 | 1 |

The outputs from each adder of the adder unit may be summarized as shown in Table 1 in which, as already indicated above, A is a binary input from H1, B is a binary input from H2, C is a carry, and S is the output sum digit in binary form.

*Table 1*

| A | B | C | S | Carry output |
|---|---|---|---|---|
| 1 | 0 | 0 | 1 | 0 |
| 0 | 1 | 0 | 1 | 0 |
| 0 | 0 | 1 | 1 | 0 |
| 1 | 1 | 0 | 0 | 1 |
| 1 | 0 | 1 | 0 | 1 |
| 0 | 1 | 1 | 0 | 1 |
| 1 | 1 | 1 | 1 | 1 |

From Table 1 it will be seen that an S output digit is required in each of the four following instances:

A, not B, not C
B, not A, not C
C, not A, not B
A, B, C

A carry output pulse must be produced with the inputs:

A, B, not C
A, C, not B
B, C, not A
A, B, C

To obtain the controls from which the said outputs are achieved by gating, the input potentials A, B, C are passed through pulse shapers PS1, PS2, FIGURES 4 and 7, each of which gives two outputs, FIGURE 7. One group of outputs A, B, C, are normally down in potential and go up when the input to the pulse shaper rises, but with the edges of the pulses made sharper and the potential levels re-adjusted. The other groups of outputs "not A," "not B," "not C" from the pulse shapers are normally up in potential and are taken down by positive pulses into the pulse shapers.

Referring to FIGURE 7 it will be seen that in each binary adder there are seven gates BAG corresponding to the seven conditions mentioned above and set out in Table 1. The outputs from four of the gates BAG are mixed together by connecting them to a single digit output line SDO through four cathode followers CF1 sharing the same cathode load CL1. The outputs along line SDO are taken through a pulse shaper PS3 giving outputs in opposite phase and these outputs, being respectively the "S" and "not S" outputs to CCU, pass through cathode followers CF2. The outputs from the gates of the other group of four gates BAG are mixed together by connecting them to a carry output line CO through four cathode followers CF3 sharing the same cathode load CL2. The outputs along line CO are taken to the carry input of the next adder or in the case of BA8 through a pulse shaper PS4, FIGURE 4, giving outputs in opposite phase, these outputs being respectively those indicated as "16" and "not 16," FIGURES 4 and 8.

The correction coding unit, FIGURE 8, receives the outputs from the adder unit, which are in binary form, and corrects the coding according to the scale of notation of the two input digits from H1 and H2. In the apparatus herein described, the possible scales of notation are 2 (tens-of-shillings), 10 and 12 (pence) and three notation control circuits SOT, TOC, and PC, FIGURES 4 and 6, appropriate one each to each of these scales of notation are brought into the unit CCU. In each digit time DT3 to DT19 the appropriate one of these notation control circuits will be up in potential. The function of the notation control circuits is illustrated by the following examples:

EXAMPLE 8

£12 from the adder unit in DT12 results in £2 in DT12 with a carry to DT13, thus: 01100 from the adder unit = 0010 + carry from the correction coding circuit.

EXAMPLE 9

19d. from the adder unit in DT9 results in 7d. in DT9 with a carry to DT10, thus: 10011 from the adder unit = 0111 + carry from the correction coding circuit.

EXAMPLE 10

7 from the adder unit during any DT3 to DT18 gives 7 and no carry, thus: 00111 from the adder unit = 0111 from the correction coding circuit.

The possible outputs from the adder unit and the corresponding outputs required from the correction coding unit CCU when scale-of-two numbers are being added are shown in the following Table 2.

*Table 2*

| Possible outputs from adder | | | | | Number of 10/- | Output from correction coding | | | | |
|---|---|---|---|---|---|---|---|---|---|---|
| C (16) | 8 | 4 | 2 | 1 | | Carry (£) | 8 | 4 | 2 | 1 |
| 0 | 0 | 0 | 0 | 0 | 0 | 0 | 0 | 0 | 0 | 0 |
| 0 | 0 | 0 | 0 | 1 | 1 | 0 | 0 | 0 | 0 | 1 |
| 0 | 0 | 0 | 1 | 0 | 2 | 1 | 0 | 0 | 0 | 0 |
| 0 | 0 | 0 | 1 | 1 | 3 | 1 | 0 | 0 | 0 | 1 |

(Maximum output 10/-+10/-+carry from shillings=£1: 10; 0).

The possible outputs from the adder unit and the corresponding outputs required from the correction coding unit CCU when scale-of-ten numbers are being added are shown in the following Table 3:

*Table 3*

| Possible outputs from adder | | | | | Decimal notation | Outputs from correction coding | | | | |
|---|---|---|---|---|---|---|---|---|---|---|
| C (16) | 8 | 4 | 2 | 1 | | Carry | 8 | 4 | 2 | 1 |
| 0 | 0 | 0 | 0 | 0 | 0 | 0 | 0 | 0 | 0 | 0 |
| 0 | 0 | 0 | 0 | 1 | 1 | 0 | 0 | 0 | 0 | 1 |
| 0 | 0 | 0 | 1 | 0 | 2 | 0 | 0 | 0 | 1 | 0 |
| 0 | 0 | 0 | 1 | 1 | 3 | 0 | 0 | 0 | 1 | 1 |
| 0 | 0 | 1 | 0 | 0 | 4 | 0 | 0 | 1 | 0 | 0 |
| 0 | 0 | 1 | 0 | 1 | 5 | 0 | 0 | 1 | 0 | 1 |
| 0 | 0 | 1 | 1 | 0 | 6 | 0 | 0 | 1 | 1 | 0 |
| 0 | 0 | 1 | 1 | 1 | 7 | 0 | 0 | 1 | 1 | 1 |
| 0 | 1 | 0 | 0 | 0 | 8 | 0 | 1 | 0 | 0 | 0 |
| 0 | 1 | 0 | 0 | 1 | 9 | 0 | 1 | 0 | 0 | 1 |
| 0 | 1 | 0 | 1 | 0 | 10 | 1 | 0 | 0 | 0 | 0 |
| 0 | 1 | 0 | 1 | 1 | 11 | 1 | 0 | 0 | 0 | 1 |
| 0 | 1 | 1 | 0 | 0 | 12 | 1 | 0 | 0 | 1 | 0 |
| 0 | 1 | 1 | 0 | 1 | 13 | 1 | 0 | 0 | 1 | 1 |
| 0 | 1 | 1 | 1 | 0 | 14 | 1 | 0 | 1 | 0 | 0 |
| 0 | 1 | 1 | 1 | 1 | 15 | 1 | 0 | 1 | 0 | 1 |
| 1 | 0 | 0 | 0 | 0 | 16 | 1 | 0 | 1 | 1 | 0 |
| 1 | 0 | 0 | 0 | 1 | 17 | 1 | 0 | 1 | 1 | 1 |
| 1 | 0 | 0 | 1 | 0 | 18 | 1 | 1 | 0 | 0 | 0 |
| 1 | 0 | 0 | 1 | 1 | 19 | 1 | 1 | 0 | 0 | 1 |

(Maximum output 9+9+carry=9+carry.)

The possible outputs from the adder unit and the corresponding outputs required from the correction coding unit CCU when scale-of-twelve numbers are being added are shown in the following Table 4:

*Table 4*

| Possible outputs from adder | | | | | Number of pence | Outputs from correction coding | | | | |
|---|---|---|---|---|---|---|---|---|---|---|
| C (16) | 8 | 4 | 2 | 1 | | Carry (1/–) | 8 | 4 | 2 | 1 |
| 0 | 0 | 0 | 0 | 0 | 0 | 0 | 0 | 0 | 0 | 0 |
| 0 | 0 | 0 | 0 | 1 | 1 | 0 | 0 | 0 | 0 | 1 |
| 0 | 0 | 0 | 1 | 0 | 2 | 0 | 0 | 0 | 1 | 0 |
| 0 | 0 | 0 | 1 | 1 | 3 | 0 | 0 | 0 | 1 | 1 |
| 0 | 0 | 1 | 0 | 0 | 4 | 0 | 0 | 1 | 0 | 0 |
| 0 | 0 | 1 | 0 | 1 | 5 | 0 | 0 | 1 | 0 | 1 |
| 0 | 0 | 1 | 1 | 0 | 6 | 0 | 0 | 1 | 1 | 0 |
| 0 | 0 | 1 | 1 | 1 | 7 | 0 | 0 | 1 | 1 | 1 |
| 0 | 1 | 0 | 0 | 0 | 8 | 0 | 1 | 0 | 0 | 0 |
| 0 | 1 | 0 | 0 | 1 | 9 | 0 | 1 | 0 | 0 | 1 |
| 0 | 1 | 0 | 1 | 0 | 10 | 0 | 1 | 0 | 1 | 0 |
| 0 | 1 | 0 | 1 | 1 | 11 | 0 | 1 | 0 | 1 | 1 |
| 0 | 1 | 1 | 0 | 0 | 12 | 1 | 0 | 0 | 0 | 0 |
| 0 | 1 | 1 | 0 | 1 | 13 | 1 | 0 | 0 | 0 | 1 |
| 0 | 1 | 1 | 1 | 0 | 14 | 1 | 0 | 0 | 1 | 0 |
| 0 | 1 | 1 | 1 | 1 | 15 | 1 | 0 | 0 | 1 | 1 |
| 1 | 0 | 0 | 0 | 0 | 16 | 1 | 0 | 1 | 0 | 0 |
| 1 | 0 | 0 | 0 | 1 | 17 | 1 | 0 | 1 | 0 | 1 |
| 1 | 0 | 0 | 1 | 0 | 18 | 1 | 0 | 1 | 1 | 0 |
| 1 | 0 | 0 | 1 | 1 | 19 | 1 | 0 | 1 | 1 | 1 |
| 1 | 0 | 1 | 0 | 0 | 20 | 1 | 1 | 0 | 0 | 0 |
| 1 | 0 | 1 | 0 | 1 | 21 | 1 | 1 | 0 | 0 | 1 |
| 1 | 0 | 1 | 1 | 0 | 22 | 1 | 1 | 0 | 1 | 0 |
| 1 | 0 | 1 | 1 | 1 | 23 | 1 | 1 | 0 | 1 | 1 |

(Maximum output 11d.+11d.+1 carry=1s. 11d.).

The notation control circuits are shown in FIGURES 5 and 6 and, should pulses be present on lines H18 or H28 during DT2 they will be prevented from passing through gates HCG1 and HCG2 but will pass along lines H181, H281 to a Sterling control circuit, FIGURE 5, where they are applied to Sterling control gates SCG1, SCG2 to which a pulse is also applied at SCP during DT2, the digit time during which pulses along lines H181 and H281 indicate that decimal numbers are to be added. The outputs from gates SCG1 and SCG2 are mixed and there will be a pulse from this mix only if the numbers about to be added are decimal numbers. The mix of outputs from gates SCG1 and SCG2 is discharged by a pulse DWF1, FIGURES 5 and 10, to give a sharper pulse to trigger a flip-flop TC1. The pulse so produced is used to trigger the anode M of the flip-flop trigger circuit TC1 down in potential at the end of digit time DT2 and the anode remains down until it is triggered back at the end of digit time DT20 by the back edge of a pulse applied at SRP. While the anode M is up in potential, indicating that the numbers to be added are Sterling numbers, it holds up the potential of line SC2 through cathode follower CF4 and this gate-conditioning potential controls the scale-of-ten control gates ST1, ST2 and pence and tens-of-shillings control gates PT1 and PT2, FIGURE 6. The mix also results in a decimal indication pulse being passed through a decimal indication control gate DIG for mixing, via line DIG1, in the "8" line of H3, FIGURES 4 and 8, but the function of the decimal indication control gate forms no part of the present invention and no further description relative thereto will be included herein.

Referring to FIGURE 6, the anode N of a flip-flop trigger circuit TC2 is normally maintained up in potential by trigger pulses applied at TP1 and TP2 during digit times DT9 and DT11. Gate-conditioning pulses are applied to TP3 and TP4 during digit times DT8 and DT10 respectively. When line SC2 is up in potential the DWF2 pulses in DT8 and DT10 pass through the gates ST1 and ST2 respectively and are mixed, being discharged with the DWF2 waveform. The back edges of these pulses trigger anode N down by the end of DT8 and the end of DT10. After anode N has been triggered down it is triggered up again by the back edges of trigger pulses applied at TP1 and TP2.

The scale-of-ten control, anode N, is therefore up in potential for the whole of a period of digit times DT1 to DT20 when Sterling numbers are being added, except for the periods of digit times DT9 and DT11, which are the only digit times that the digits to be added are not in the scale-of-ten. When the numbers to be added are wholly decimal numbers the gates ST1 and ST2 remain closed due to the triggering of anode M as described above and accordingly the potential of anode N remains up for the whole of digit times DT1 to DT20. The scale-of-ten potential on line SOT, FIGURES 6 and 8, is passed through cathode follower CF5 to control the coding of scale-of-ten digits issuing in binary form from the adder unit.

During the addition of Sterling numbers, the pence control potential is raised during digit time DT9 when the scale-of-ten potential is down, and the tens-of-shillings control potential is raised during digit time DT11 when the scale-of-ten potential is down. This is effected by gate-conditioning pulses applied at TP6 and TP5, FIGURE 6 during digit times DT9 and DT11 to the pence control line PC and the tens-of-shillings control line TOC through gates PT2 and PT1. The outputs from these gates are coupled to the grids of cathode followers CF6, CF7 via capacitors CA, the level of the cathode follower grids being restored to the required lower potential by a restore potential applied at RP, FIGURE 6.

Each group of gating potentials taken into the correction coding unit CCU, FIGURE 8 is passed to positive coincidence correction coding gates PCG and the outputs from the gates are mixed, using cathode follower load mixes CFM, of the kind described above with reference to FIGURE 7 to obtain coded outputs, as appropriate, along the lines H31, H32, H34, and H38 and a carry CC to BA1.

The gates PCG may be of any suitable form which will give an output on the application thereto of pulses from the adder and from the notation control means, but in the preferred form thereof the gates, as can be seen from FIGURE 8 are connected to a high tension line HT and to a line DWF2 which latter line is provided to remove spurious pulses from the outputs of the gates and goes up in potential during each digit time DT for an interval of time as indicated in FIGURE 10. Accordingly, the potential on line DWF2 conditions each of the gates PCG so that, if while the gates are so conditioned, one of the gates also receives pulses, as appropriate, from the adder unit and from the notation control means an output pass through the gate. For example, if when the second gate from the left, as viewed in FIGURE 8 is conditioned there are applied thereto pulses S2, NOT S8, NOT 16, from the adder unit and SOT from the notation control means the gate will pass an output to line H32 representative of coded decimal digit "2." Should there also be pulses S4, NOT S8, NOT 16, applied to the sixth gate from the left of FIGURE 8 then there will also be an output from that gate to line H34 and the two outputs will be representative of coded decimal digit 6. The full range of outputs from the correction coding circuit and the significance thereof is shown in tabular form in Table 5.

*Table 5*

| Outputs from adder unit | Outputs from notation control means | Outputs from gates PCG | Notational significance of S1, S2, S4, S8, 16 inputs |
|---|---|---|---|
| S1 | -------- | H31=1 | Decimal, tens-of-shillings, or pence. |
| S2, NOT S8, NOT 16 | SOT | H32=2 | Decimal. |
| NOT S2, S4, S8 | SOT | H32=2 | Decimal. |
| NOT S2, 16 | SOT | H32=2 and 4. | Decimal. |
| S2 | PC | H32=2 | Pence. |
| S4, NOT S8, NOT 16 | -------- | H34=4 | Decimal, or pence. |
| S2, S4, S8 | SOT | H34=4 | Decimal. |
| NOT S4, 16 | PC | H34=4 | Pence. |
| NOT S2, NOT S4, S8 | -------- | H38=8 | Decimal, or pence. |
| S2, 16 | SOT | H38=8 | Decimal. |
| NOT S4, S8 | PC | H38=8 | Pence. |
| S4, 16 | PC | H38=8 | Pence. |
| S4, S8 | -------- | CC=Carry | Decimal, or pence. |
| 16 | -------- | CC=Carry | Decimal, or pence. |
| S2, S8 | SOT | CC=Carry | Decimal. |
| S2 | TOC | CC=Carry | Tens-of-shillings. |

From the immediately preceding description it will be understood that correction coding circuit includes gates which are operable on the application thereto of a notation determining pulse and of pulses from a coded binary adder to cause outputs from the gates representative of a coded digit according to a notation as determined by the notation determining pulse and as necessary a carry for entry into the adder.

It will be understood that because the digits are entered serially the carry CC must be applied to the adder BA1 during the digit time next succeeding that in which it is created. To ensure that the carry CC is applied at the appropriate time there is provided a carry delay circuit, FIGURE 9, consisting of two flip-flop trigger circuits TC3 and TC4. The potential of anode P of TC3 triggers TC4 and the potential of anode W of TC4 is the delayed carry. The wave-forms, FIGURE 10, illustrate the operation of the delay circuit. The clock pulses CP, negative anti-clock pulses NCP, FIGURE 10, pulses DWF1 and DWF2 are produced, in any suitable manner not shown, in every digit time (DT) in synchronism with the drum D.

The potential of anode P is normally maintained down by the negative anti-clock pulse NCP triggering the flip-flop TC3, and the potential of anode W is maintained down by the DWF2 pulses triggering the flip-flop TC4. If there is a carry during the first DT shown in FIGURE 10 this is applied to a delay unit gate DUG to gate the clock pulse CP to the flip-flop TC3 thus triggering the potential of anode P up on its back edge. The potential of P is brought down again by the negative-going edge of the negative anti-clock pulse NCP at the beginning of the next succeeding digit time DT. Anode P going down in potential triggers up anode W and this remains up until the back edge of the DWF2 pulse in said next succeeding digit time. The up potential of anode W is the delayed carry and is passed through a cathode follower CF8, FIGURE 9, to a carry gate DCG to be gated with a carry-gating pulse applied at DCP during digit times DT3 to DT19 thus limiting the output from the delay circuit to the number digit times DT3 to DT18 and to the sign digit DT19. The output from the gate DCG passes through a cathode follower CF9 and is taken as a carry pulse DC FIGURE 4, through the pulse shaper PS2 to the input of adder BA1. Accordingly, the carry indicated in the first of the digit times, FIGURE 10, is added in during the next succeeding digit time.

In the foregoing description there has been described an apparatus in which digits to be added are entered serially in ascending denominational order and this form of apparatus is that which is preferred as by reason thereof the apparatus is compact and relatively economical to produce. It will be understood, however, that if desired apparatus of the kind described may be used for the parallel addition of digits by providing a sufficient number, one for each denomination, of sets of the apparatus. When addition is effected in parallel it will be understood that a carry from one correction coding unit will be effected into the adder unit of next higher denomination and the carry delay circuits will not be employed.

It will be understood that, if desired, instead of the notation-determining pulses being, as described above, stored with the numbers a change in notation from Sterling to decimal, or vice versa, could be programmed, in which event the trigger pulse to the flip-flop TC1, FIGURE 5 would be obtained from a programme decoding unit. Alternatively, a Decimal/Sterling indication could be given by means of a manually operable switch which when set "Sterling" would connect the line SC2, FIGURE 6 to a suitable potential, and which when set to "Decimal" would connect the line SC2 to a suitable lower potential.

I claim:

1. Electrical computing apparatus comprising a store for numbers in different scales of notation each number being preceded by a scale-of-notation indication and each digit of the numbers being represented in a parallel binary code, a parallel binary coded adder having a plurality of orders each order having an output, means for simultaneously reading two numbers serially from the store for addition by said adder, notation control means connected to the store and arranged to store said scale-of-notation indication during the addition of the numbers, a number of radix lines providing outputs from said notation control means each radix line being appropriate to a different radix of said digits and the notation control means being operable during reading of the numbers from the store to energize the appropriate radix line for each pair of digits as they are read, a plurality of correction coding gates having inputs connected to said adder outputs, output lines corresponding to said parallel binary code orders connected to said gates and including a carry line connected to the adder, the correction coding gates including a gate for each parallel binary code order operable to route a binary sum unchanged on to the output lines when the sum does not exceed the radix, and each radix line being connected to at least one gate of the remaining gates which are each connected to predetermined outputs from the adder so that energization of the radix line appropriate to the digits being added conditions the gates connected to said radix line to cause said gates to recode the binary sum output from the adder when it exceeds the radix to produce a corrected binary coded digit in the scale of notation indicated and a carry for addition to the sum of the next digits of the numbers.

2. Apparatus according to claim 1 wherein the notation control means includes a scale-of-ten control circuit, a pence control circuit, and a tens-of-shillings control circuit each to transmit a notation determining pulse to the correction coding gates under control of gate-conditioning pulses and a gate-conditioning potential applied to scale-of-ten control gates and to pence and tens-of-shillings control gates included respectively in said circuits, the gate-conditioning pulses being applied to ensure that the appropriate correction coding gates are conditioned at the times in which decimal digits, pence digits, or tens-of-shillings digits are respectively read from store.

3. Apparatus according to claim 2, wherein said gate-conditioning potential is derived from a Sterling control circuit normally up in potential to apply the gate-conditioning potential to the scale-of-ten, to the pence, and to the tens-of-shillings control gates said Sterling control circuit being controlled by Sterling control gates conditioned during a time preceding that in which a first digit can be read from store whereby if during said preceding time a decimal control indication is read from store the resultant pulse is applied to the Sterling control gates thereby to trigger the Sterling control circuit down in potential.

4. Apparatus according to claim 3, wherein the gate-conditioning potential is derived from one anode of a flip-flop trigger circuit which if the anode is down in potential at the end of a group of digit reading times is triggered to the condition of being up in potential by a pulse applied to the grid thereof during the last digit reading time of the group.

5. Apparatus according to claim 4, wherein the scale-of-ten notation-determining pulse is derived from a flip-flop trigger circuit one anode of which is preselected to transmit the pulse and is normally up in potential and which is triggered down in potential during those digit reading times in which pence and tens-of-shillings digits are read from store.

6. Apparatus according to claim 5, wherein digits are entered serially into the adder unit and a carry pulse from the correction coding gates is passed to the adder unit through a carry delay circuit, arranged to enter a carry pulse into the adder unit together with the digit of next higher denominational order.

7. Apparatus according to claim 6, wherein the delay circuit comprises two flip-flop trigger circuits the second of which is triggered by the first, a delay unit gate through which a trigger pulse is gated by a carry pulse from the correction coding gates the carry being passed to the grid of the first flip-flop to condition it for resetting by a pulse applied to the other grid of the flip-flop thereby to effect triggering of the second flip-flop and condition a carry gate to pass a carry on application to the gate of a carry-gating pulse.

References Cited in the file of this patent

UNITED STATES PATENTS

| | | |
|---|---|---|
| 2,686,632 | Wilkinson | Aug. 17, 1954 |
| 2,697,549 | Hobbs | Dec. 21, 1954 |
| 2,787,416 | Hansen | Apr. 2, 1957 |
| 2,890,830 | Woods-Hill | June 16, 1959 |

FOREIGN PATENTS

| | | |
|---|---|---|
| 650,685 | Great Britain | Feb. 28, 1951 |
| 678,427 | Great Britain | Sept. 3, 1952 |
| 738,605 | Great Britain | Oct. 19, 1955 |

OTHER REFERENCES

Townsend: "Serial Digital Adders for a Variable Radix of Notation," Electronic Engineering (British), vol. 25, October 1953, pp. 410–416 relied on.

"Synthesis of Electronic Computing and Control Circuits," Harvard University Press, 1951, pp. 184–186 relied on.

Bird: "Computing Machines—Input and Output," Electronic Engineering, vol. 25, October 1953, pp. 409, 410.